March 10, 1964 C. L. WANLASS 3,124,785

MAGNETIC MEMORY CORE

Filed April 20, 1959

INVENTOR
CRAVENS L. WANLASS
BY HIS ATTORNEYS
HARRIS, KIECH, RUSSELL & KERN 3,124,785

MAGNETIC MEMORY CORE

Cravens L. Wanlass, Woodland Hills, Calif., assignor, by mesne assignments, to Ford Motor Company, Dearborn, Mich., a corporation of Delaware
Filed Apr. 20, 1959, Ser. No. 807,390
6 Claims. (Cl. 340—174)

This invention relates to an orthogonal axis magnetic circuit element suitable for use as a memory device or the like. It is an object of the invention to provide a memory device which is an improvement on that shown in my copending application entitled "Memory Device," Serial No. 723,435 filed March 24, 1958.

Some memory devices place severe requirements on the wave form and magnitude of the write current. This is particularly true where a plurality of the memory devices are used in a matrix having a plurality of X and Y axes for selectively writing information in any one of the devices of the matrix. It is an object of the present invention to provide a memory device utilizing two write conductors in which neither the wave form nor the magnitude of the write currents is significant as long as the write current exceeds the minimum required. A further object of the invention is to provide a binary memory device in which a one or a zero can be stored by means of time coincidence of two current pulses along the write-read axis of the magnetic material.

It is an object of the invention to provide a memory device utilizing two write conductors in which the state of the device is independent of the current in one conductor so long as the current in the other conductor is less than a minimum. A further object is to provide such a memory device suitable for use with various types of read-out systems including either a single interrogate conductor or a plurality of interrogate conductors, destructive or nondestructive read-out, and coincident or oersted-second methods of selection.

It is an object of the invention to provide a memory unit having a block of magnetic material with two parallel write axes and an orthogonal interrogate axis with one of the write axes positioned intermediate the interrogate axis and the other write axis and with one of the write conductors looped through the magnetic material passing adjacent both write axes. A further object of the invention is to provide such a memory unit in which the looped write conductor may also be used as the output conductor and in which a separate output conductor can be used along the intermediately positioned axis when desired.

It is an object of the invention to provide a memory unit having a block of magnetic material with two parallel openings passing therethrough and a third opening passing therethrough orthogonal to the first two openings. A further object is to provide such a unit having a first write conductor in the outer parallel opening and a second write conductor looped through the outer and inner parallel openings and at least one interrogate conductor in the orthogonal opening. Another object is to provide such a unit in which a separate output conductor can be positioned in the inner parallel opening.

It is an object of the invention to provide a memory device in which the reluctance of the magnetic path around the outer write axis is less than that around the inner write axis. A further object of the invention is to provide such a unit in which the magnetic path length around the outer write axis is less than the length around the inner write axis. Another object of the invention is to provide such a unit in which the cross-sectional area of the outer parallel opening is less than that of the inner parallel opening.

It is an object of the invention to provide a memory device utilizing a block of magnetic material and conductors as set out above, together with suitable circuitry for providing the required current pulses to the conductors. A further object of the invention is to provide a memory unit which can be used in combination with other memory units in the manner described in my aforesaid copending application. Another object of the invention is to provide such a memory unit which can be manufactured in the same manner as the memory unit of said copending application.

The invention also comprises novel details of construction and novel combinations and circuit arrangements, together with other objects, advantages, features and results which will more fully appear in the course of the following description. The drawing merely shows and the description merely describes preferred embodiments of the present invention which are given by way of illustration or example.

Figures 1, 2, 3:
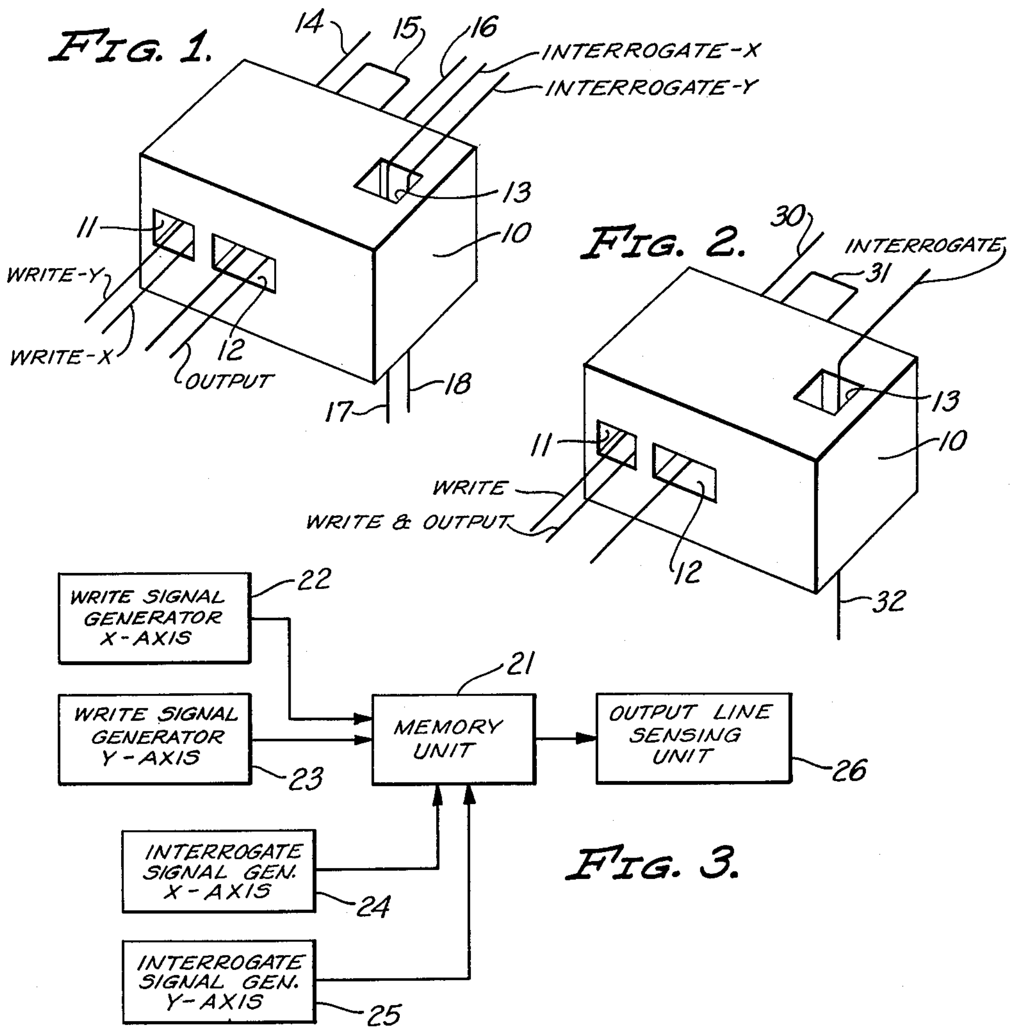
FIG. 1 is an isometric view of a preferred form of the memory device of the invention.
FIG. 2 is an isometric view of an alternative form of the invention.
FIG. 3 is a block diagram of a circuit utilizing the memory device of the invention.

FIG. 1 shows a memory device of the invention suitable for storing a single bit of information. The information is stored in binary form in a block 10 of magnetic material, there being two states or conditions for the memory which are ordinarily referred to as the one or positive state and the zero or negative state corresponding to two opposite orientations of flux in certain zones of the block of magnetic material. The particular type of material utilized is not critical, but it should have sufficient hysteresis characteristics such that magnetic retentivity is present. The ferrite materials presently available are suitable from the manufacturing view and provide satisfactory operation of the memory device.

Openings 11, 12 and 13 are provided in the block 10 for passing conductors through the block, with a first flux zone between the openings 11, 12 and a second flux zone between the openings 12, 13. The openings 11 and 12 pass through the block parallel to each other and orthogonal to the opening 13, with the opening 12 positioned between the openings 11 and 13. A write or input conductor 14 is positioned in the opening 11. Another write or input conductor 15 is passed through the opening 11 adjacent the conductor 14 and is looped back through the opening 12. An output or read conductor 16 is passed through the opening 12 adjacent the conductor 15. Interrogate or sense conductors 17 and 18 are positioned in the opening 13.

The circuit of FIG. 3 includes a memory unit 21 corresponding to the unit of FIG. 1. A write signal generator 22 is connected to the write conductor 15 and a write signal generator 23 is connected to the write conductor 14 to provide the necessary write signals as will be described below. An interrogate signal generator 24 is connected to the interrogate conductor 17 and an interrogate signal generator 25 is connected to the interrogate conductor 18 to provide the necessary interrogate signals. An output line sensing unit 26 is connected to the output conductor 16.

Referring again to the block 10 of FIG. 1, the cross-sectional area of the opening 12 is greater than that of the opening 11 so that the magnetic path around the opening 12 and, therefore, the reluctance of the path therearound is greater than for the opening 11. The flux zone of interest in the block lies between the output conductor 16 and the interrogate conductors 17, 18, i.e., between the openings 12 and 13. In order to write a one or a zero in this zone, i.e., to change the flux orientation to positive or negative, it is necessary to have write currents present in both write conductors 14 and 15 at the same time. If there is only a current in the write conductor 14, a magnetic field will be created corresponding to this current about this conductor only, i.e., about the opening 11 only. Similarly, if a current is introduced in the write conductor 15 only, a magnetic field will be produced along the same path as with the current in the conductor 14, i.e., around the opening 11 only. However, a coincidence in time of the write currents in the conductors 14 and 15 will cause saturation of the path around the opening 11 and will produce a field around the opening 12 also. This field around the opening 12 will cause a storage of information in the magnetic material adjacent the orthogonal opening 13. The sense of the information stored will depend upon the sense of the current in the conductor 15.

Hence, it is seen that writing of a one or a zero in the memory unit of the invention requires only time coincidence of the current pulses from the write signal generators. There is no limitation on the wave form or amplitude of the applied current as long as the amplitude is sufficient to produce flux changes in the magnetic material.

It should be noted that while all of the conductors have been shown as one turn windings, each of the conductors could actually comprise a plurality of turns. However, ordinarily only a single turn is used in order to obtain higher writing and reading speeds.

After a one or a zero has been stored in the memory device in the manner described above, the state of the device may be determined by any one of several interrogation methods, including those shown in my aforesaid copending application. Basically, the interrogate conductors will be provided with sufficient current to produce a flux around the conductors and the opening 13. Because of the orthogonal relationship of the conductors in the openings 12 and 13, the flux created by the interrogate conductors will cause a collapse of the flux around the conductors in the opening 12. This collapse in flux will generate an output pulse on the output conductor 16, the sense of the pulse being dependent upon the sense of the flux field which is collapsing.

The embodiment of FIGS. 1 and 3 is designed for selective, nondestructive read-out. Selective nondestructive read-out does not require precise control of either amplitude or duration of the interrogate current pulses applied to the conductors 17 and 18. It requires only that the product of the current amplitude and the pulse duration be equal to or greater than a given minimum quantity to be defined below. The write-read axis and the interrogate axis of the unit are magnetically independent except for the flux sharing of the common material between the openings 12 and 13. The interrogation system makes use of the fact that temporary interaction in the shared magnetic material between the two axes is much accentuated when one axis is switched or changed from one state of maximum magnetic induction to the other state of maximum magnetic induction. When information is stored around the write-read axis in the form of a positive or negative flux, the voltage signal on the output conductor 16 is in the order of 10 times greater when the material around the interrogate axis is switched from one state of magnetization to the other state of magnetization than when the same amount of interrogate current is applied in a direction such as to drive the magnetic state of the interrogate axis material further into its present state of magnetic saturation. Also, the polarity of the output pulse on the output conductor is independent of the direction in which the interrogate axis material is being switched, the output being dependent in polarity only upon the sense of the flux around the write-read axis.

Hence, the memory unit of FIG. 1 can be interrogated by providing a current pulse on one of the interrogate conductors 17, 18 of sufficient magnitude to cause a change in state of the material around the interrogate axis. Alternatively, the unit may be interrogated by coincident current pulses on both conductors 17 and 18 with the combination of the pulses providing the change in flux state. Ordinarily, each pulse will be slightly greater than half of that required to produce such a change in state. It should be noted that a plurality of memory devices may be connected in a conventional X—Y matrix with nondestructive, selective read-out operation achieved.

Figure 4:
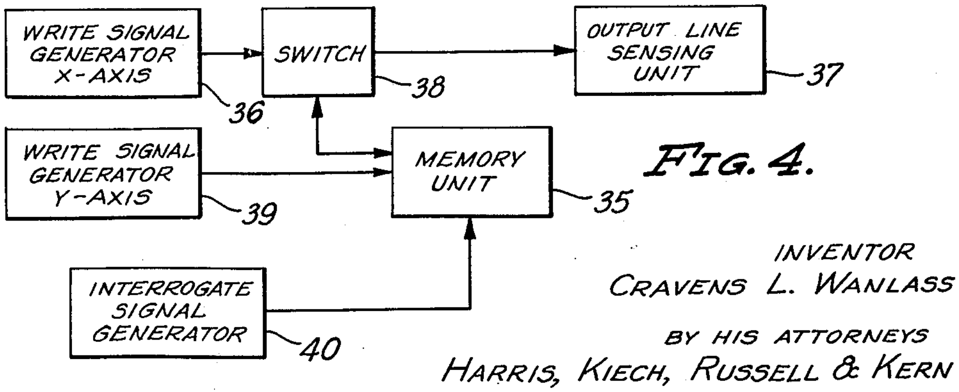
FIG. 4 is a block diagram of an alternative circuit utilizing the memory device of the invention.

The memory unit of FIG. 2 includes several alternative forms of the invention. The block 10 of the embodiment of FIG. 1 is utilized with a write conductor 30 positioned in the opening 11 and a write-output conductor 31 looped through the openings 11 and 12. An interrogate conductor 32 is positioned in the opening 13. The memory unit of FIG. 2 is shown as the unit 35 of FIG. 4 wherein a write signal generator 36 and an output line sensing unit 37 are connected to the write-output conductor 31 through a switch 38. Another write signal generator 39 is connected to the write conductor 30 and an interrogate signal generator 40 is connected to the interrogate conductor 32.

Information is stored in the memory device of FIG. 2 in the same manner as in the device of FIG. 1, with the switch 38 connecting the signal generator 36 to the conductor 31. When it is desired to interrogate the memory device, the conductor 31 is disconnected from the signal generator 36 and is connected to the output line sensing unit 37 and the device is interrogated in the same manner as in the device of FIG. 1.

The unit of FIG. 2 is simpler than that of FIG. 1 in that a single conductor 31 serves both as one of the write conductors and as the output conductor. However, an additional switching function is required in order to achieve this saving. Therefore, the choice of the particular type of memory device will depend upon the specific application of the unit. Similarly, only a single interrogate conductor is utilized in the device of FIG. 2 resulting in a simpler unit. Here, also, the choice of method of interrogation will depend upon the specific application.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim as my invention:

1. In a circuit element for use as a memory unit or the like, the combination of: a block of magnetic material having first and second openings therethrough parallel to each other with a first flux zone therebetween, and a third opening therethrough perpendicular to said second opening with a second flux zone therebetween, and including a first flux path about said first opening, a second flux path about said second opening such that magnetic fluxes along said first and second paths aid and cancel in said first zone, with said second flux path having a greater reluctance than said first flux path, and a third flux path about said third opening intersecting and perpendicular to said second flux path in said second zone; first means for generating a flux about said first opening; second means for generating a flux about said first opening with simultaneous operation of said first and second means producing a flux about said second opening and in said second zone; third means for generating a flux about said third opening; and output means for determining flux changes occurring about said second opening during operation of said third means, with flux change about said second opening producing an output pulse on a conductor in said second opening with the polarity of said output pulse being a function of the polarity of the flux about said second opening and independent of the polarity of the flux about said third opening.

2. In a circuit element for use as a memory unit or the like, the combination of: a block of magnetic material having first and second openings therethrough parallel to each other with a first flux zone therebetween, and a third opening therethrough perpendicular to said second opening with a second zone therebetween, and including a first flux path about said first opening, a second flux path about said second opening such that magnetic fluxes along said first and second paths aid and cancel in said first zone, with said second flux path having a greater reluctance than said first flux path, and a third flux path about said third opening intersecting and perpendicular to said second flux path in said second zone; a first conductor positioned in said first opening; a second conductor positioned in said first opening and looped back through said second opening with simultaneous energization of said first and second conductors producing a flux about said second axis and in said second zone; a third conductor positioned in said third opening; and output means for determining flux changes occurring about said second opening during energization of said third conductor, with flux change about said second opening producing an output pulse on a conductor in said second opening with the polarity of said output pulse being a function of the polarity of the flux about said second opening and independent of the polarity of the flux about said third opening.

3. In a circuit element for use as a memory unit or the like, the combination of: a block of magnetic material having first and second openings therethrough parallel to each other with a first flux zone therebetween, and a third opening therethrough perpendicular to said second opening with a second flux zone therebetween, and including a first flux path about said first opening, a second flux path about said second opening such that magnetic fluxes along said first and second paths aid and cancel in said first zone, with said second flux path having a greater reluctance than said first flux path, and a third flux path about said third opening intersecting and perpendicular to said second flux path in said second zone; a first conductor positioned in said first opening; a second conductor positioned in said first opening and looped back through said second opening with simultaneous energization of said first and second conductors producing a flux about said second opening and in said second zone; third and fourth conductors positioned in said third opening for generating a flux about said third opening; and a fifth conductor positioned in said second opening for determining flux changes occurring about said second opening during energization of said third and fourth conductors, with flux change about said second opening producing an output pulse on said fifth conductor with the polarity of said output pulse being a function of the polarity of the flux about said second opening and independent of the polarity of the flux about said third opening.

4. In a memory device, the combination of: a unitary block of magnetic material having first and second openings therethrough parallel to each other with a first flux zone therebetween, and a third opening therethrough perpendicular to said second opening with a second flux zone therebetween, and including a first flux path about said first opening, a second flux path about said second opening such that magnetic fluxes along said first and second paths aid and cancel in said first zone, with said second flux path having a greater reluctance than said first flux path, and a third flux path about said second opening intersecting and perpendicular to said second flux path in said second zone; at least one interrogate conductor positioned in said third opening; a first write conductor positioned in said first opening and looped back through said second opening; a second write conductor positioned in said first opening; first means for selectively applying positive and negative current pulses to said first write conductor; second means for applying a current pulse to said second write conductor coincident in time with the current pulses to said first write conductor for producing a flux about said second opening and in said second zone; third means for applying a current pulse to said interrogate conductor for generating a flux about said third opening; and output means for determining flux changes occurring about said second opening during operation of said third means, with flux change about said second opening producing an output pulse on a conductor in said second opening with the polarity of said output pulse being a function of the polarity of the flux about said second opening and independent of the polarity of the flux about said third opening.

5. In a memory device, the combination of: a unitary block of magnetic material having first and second openings therethrough parallel to each other with a first flux zone therebetween, and a third opening therethrough perpendicular to said second opening with a second flux zone therebetween, and including a first flux path about said first opening, a second flux path about said second opening such that magnetic fluxes along said first and second paths aid and cancel in said first zone, with said second flux path having a greater reluctance than said first flux path, and a third flux path about said second opening intersecting and perpendicular to said second flux path in said second zone; first and second interrogate conductors positioned in said third opening; a first write conductor positioned in said first opening and looped back through said second opening; a second write conductor positioned in said first opening; first means for selectively applying positive and negative current pulses to said first write conductor; second means for applying a current pulse to said second write conductor coincident in time with the current pulses to said first write conductor for producing a flux about said second opening and in said second zone; means for applying current pulses to said first and second interrogate conductors simultaneously; and output means for determining flux changes occurring about said second opening during said simultaneous intrrogate current pulses, with flux change about said second opening producing an output pulse on a conductor in said second opening with the polarity of said output pulse being a function of the polarity of the flux about said second opening and independent of the polarity of the flux about said third opening.

6. In a memory device, the combination of: a unitary block of magnetic material having first and second openings therethrough parallel to each other with a first flux zone therebetween, and a third opening therethrough perpendicular to said second opening with a second flux zone therebetween, and including a first flux path about said first opening, a second flux path about said second opening such that magnetic fluxes along said first and second paths aid and cancel in said first zone, with said second flux path having a greater reluctance than said first flux path, and a third flux path about said second opening intersecting and perpendicular to said second flux path in said second zone; at least one interrogate conductor positioned in said third opening; a first write conductor positioned in said first opening and looped back through said second opening; a second write conductor positioned in said first opening; means for selectively generating positive and negative current pulses; switch means for selectively coupling said first write conductor to said generating means and to an output unit; means for applying a current pulse to said first write conductor coincident in time with the current pulses of said generating means for producing a flux about said second opening and in said second zone when said generating means is coupled to said first write conductor; and interrogate means for applying a current pulse to said interrogate conductor, with said output unit including means for determining flux changes occurring about said second opening during operation of said interrogate means, with flux change about said second opening producing an output pulse at said output unit with the polarity of said output pulse being a function of the polarity of the flux about said second opening and independent of the polarity of the flux about said third opening.

References Cited in the file of this patent

UNITED STATES PATENTS

| | | |
|---|---|---|
| 2,810,901 | Crane | Oct. 22, 1957 |
| 2,896,194 | Crane | July 21, 1959 |
| 2,905,834 | Arsenault | Sept. 22, 1959 |
| 2,951,245 | Kihn | Aug. 30, 1960 |
| 2,991,455 | Brown | July 4, 1961 |
| 3,056,118 | Woods | Sept. 25, 1962 |

OTHER REFERENCES

"Nondestructive Sensing of Magnetic Cores," by Buck and Frank, "Communications and Electronics," January 1954, pp. 822–830.